United States Patent Office 3,501,264
Patented Mar. 17, 1970

3,501,264
GLASSY ALKALIZED ALUMINA
Joseph M. Pilato, Silver Spring, and William P. Hettinger, Jr., Severna Park, Md., assignors to W. R. Grace & Co., New York, N.Y., a corporation of Connecticut
No Drawing. Filed Aug. 25, 1967, Ser. No. 663,224
Int. Cl. C01f 7/00
U.S. Cl. 23—52                    5 Claims

ABSTRACT OF THE DISCLOSURE

An improved alumina alkalate adsorbant having an increased adsorption capacity for sulfur compounds such as sulfur dioxide, sulfur trioxide, hydrogen sulfide and the like, and a process of preparing this alkalized alumina which process is characterized by the novel step of adding sodium gluconate to one of the initial reactant solutions prior to admixing and reaction are disclosed. Adsorption processes for the removal of sulfur compounds from gases are also disclosed.

---

The contamination of the atmoshpere with sulfur-containing acid gases such as sulfur dioxide, sulfur trioxide, hydrogen sulfide and the like have, in the past, presented industry and government with many perplexing problems. Tremendous quantities of such sulfur-containing gases are introduced into the atmosphere annually, largely from the combustion of coal and fuel oil. Early processes for removal of sulfur dioxide and the like from flue gases and other waste gas streams being discharged into the atmosphere were based largely on liquid absorption techniques. The use of liquids for such absorption, however, created substantial local pollution problems, which offset the beneficial effects of these liquid absorbents in reducing to some extent the more widespread introduction of sulfur compounds into the atmosphere.

In an attempt to solve the problems attributable to the use of liquid absorbents, Bienstock et al. in U.S. Patent 2,992,884 proposed a method for the removal of sulfur oxides from flue gases and the like with an alkalized alumina solid adsorbent. The Bienstock et al. adsorbent comprised an alumina support having dispersed on it an alkali metal oxide, preferably sodium oxide. This solid adsorbent is produced by the reaction of an aluminum salt with an alkali metal carbonate to yield a precipitate, which on drying and heating in the presence of hydrogen yields an alkalized alumina absorbent comprising substantially $Al_2O_3$ and an alkali metal oxide or more accuratey alumina alkalate ($Na_2Al_2O_4$).

Our invention provides an improvement on the product discosed in the Bienstock et al patent. We have discovered that by adding a very small amount of sodium gluconate to one of the reaction solutions in what would otherwise be a conventional process we are able to produce an alkalized alumina having an increased per weight adsorption capacity for hydrogen sulfide, sulfur oxides and the like. Thus, whereas the alkalized alumina of the prior art has an adsorption capacity expressed as the amount of sulfur dioxide adsorbed per 100 g. of alkalized alumina at 300° C., of the order of 24 g., our novel alkalized alumina has an adsorption capacity on the order of 27.5 g. of sulfur dioxide per 100 grams. Since the primary use of alkalized alumina is an adsorbent for such gases, this represents a substantial and very real improvement which will facilitate the use of smaller adsorption equipment and systems and higher flow rates and longer adsorption lives in existing systems.

It is therefore an object of our invention to provide an improved alkalized alumina and the method of preparing such alkalized alumina.

Additional objects and advantages of the invention will be apparent from the description of the preferred embodiment and examples which follow.

In accordance with the preferred process embodiment of our invention, an aqueous solution of an alkali metal carbonate is reacted with an aqueous solution of an aluminum salt. While any alkali metal carbonate can be used in the present process, such as for example sodium carbonate or potassium carbonate, the use of sodium carbonate is greatly preferred. The use of a sodium carbonate reactant results in the production of a sodium aluminate composition which is much more effective in sulfur-gas absorption than is the potassium oxide present in alkalized alumina products prepared using a potassium carbonate reactant. The aluminum salt used in the reaction is preferably aluminum sulfate. However, other aluminum salts such as aluminum nitrate or the like can also be used.

The essence of our invention resides in adding a minor quantity of sodium gluconate to one of the reaction solutions. The particular quantity of sodium gluconate added is not critical, however a range of from 0.25 to 1 gram per 1000 grams of total reaction mixture is preferred. The minimum quantity is required to insure that the improved product is produced. Conversely, the addition of sodium gluconate in excess of the maximum results in no increased benefit and merely increases the cost.

The aluminum salt solution is prepared by dissolving the desired amount of aluminum salt in water. Again, the concentration is not critical, the actual concentration used being more a consideration of physical limitations such as solubility and the capability of the process equipment to handle a given product slurry density or viscosity. When the sodium gluconate is added to the aluminum salt solution, it may be added either before, after or simultaneously with the dissolving of the aluminum salt.

The aqueous alkali metal carbonate is prepared in the same manner as the aluminium salt solutions, the concentration again being a function of physical limitations. Similarly, where the sodium gluconate is added to the carbonate solution, it may be added before, after or simultaneously with the alkali metal carbonate.

The alkali metal solution and alumina salt solution are then admixed together with constant stirring at a temperature of from 20 to 95° C. The higher temperatures (40 to 95° C.) are preferred since the reaction proceeds at a faster rate, the only real limitation being the vaporization temperature of the solutions. Thus, still higher temperatures could be used in a pressurized system, though it is doubtful that the increase in reaction rate would justify the increase in processing cost. Similarly a lower temperature, above the freezing point of the solutions, may be used if one is willing to tolerate the slower reaction rate.

The ratio of the aluminum salt solution and carbonate solutions are preferably adjusted to provide stoichiometric quantities of aluminum salt and alkali metal carbonate, with a slight excess of alkali metal carbonate being preferred, according to the reaction equation which, for example, for sodium carbonate and aluminum sulfate is:

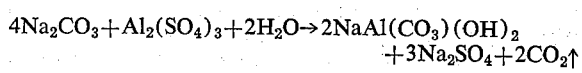

Thus for systems using other salts, the stoichiometric quantities or ratio may be obtained by balancing the fundamental equation

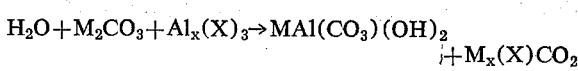

where M is the alkali metal cation and where X is the aluminum salt anion and $x$ is its valence. The water component of the solution is of course normally provided in substantial excess.

After the aluminum salt solution and carbonated solution are added to each, the resulting reaction solution is stirred for at least 1 hour and preferably at least 2 hours and then allowed to cool and age by standing at ambient temperature for at least 2 hours, and normally in the range of from 2 to 16 hours. The resulting basic alkali aluminum carbonate slurry is then filtered and the resulting basic alkali aluminum carbonate filter cake washed and dried. The washing and drying steps are not critical. Where the alkali component is sodium, the dried filter cake prior to activation is commonly referred to as Dawsonite.

The dried filter cake may then be activated by heating at a temperature of from about 400 to 1400° F. for about ½ to 4 hours, higher activation temperature requiring lower activation times. During activation our alkalized alumina product is formed according to the equation:

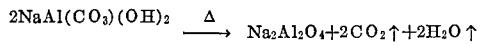

The activation heating may be effected immediately after or simultaneously with the drying or activation may be postponed and, for example, effected at the adsorption process site.

It should be noted here that although the addition of sodium gluconate as indicated above increases the adsorption capacity of the product the reason for this phenomenon is as yet unknown.

Our invention is further illustrated by the following exemplary examples but not limited thereto.

EXAMPLE I

This example illustrates the method according to our invention of producing our inventive alkalized alumina.

In this example, the alumina sulfate solution was prepared by dissolving 264 grams of $Al_2(SO_4)_3 \cdot 3H_2O$ in 654 milliliters of water; this formed 866 milliliters of solution. To this solution 1.23 grams of sodium gluconate was added. The solution was then heated to 90° C. A sodium carbonate solution was prepared by dissolving 232 grams of sodium carbonate in 1210 milliliters of water. This solution was heated to 90° C. also. The alumina sulfate solution was then added to the sodium carbonate solution with constant stirring. The admixed solution was then stirred and maintained at 90° C. for 2 hours. During the actual admixing and this stirring period a slurry was observed to be formed. The slurry was then allowed to cool and age by standing overnight, after which time the slurry was filtered. The resulting filter cake was then washed twice by slurrying with 2000 milliliters of water containing 43 grams of sodium carbonate and then refiltered. The wash product was then dried at 110° C. The dried product was then tested by X-ray analysis and was found to give an X-ray pattern corresponding to Dawsonite.

This Dawsonite product was then activated to convert it to our improved alkalized alumina by heating it at 1100° F. for 3 hours. The resulting alkalized alumina product was observed to have a glassy physical appearance and a density of 1.5.

EXAMPLE II

This example illustrates the improved adsorption capacity of our improved alkalized alumina as compared with the alkalized alumina of the prior art.

In this example a sample of the alkalized alumina produced in Example I was placed in an adsorption bed and then tested for sulfur dioxide adsorption capacity. This was done by passing a water-saturated stream of sulfur dioxide through the packed bed at a temperature of 300° C. The alkalized alumina was then analyzed for adsorption capacity on a grams of sulfur dioxide adsorbed per gram alkalized alumina basis. The alkalized alumina produced in Example I was found to have an adsorption capacity of 27.5 grams of sulfur dioxide per 100 grams of alkalized alumina.

A similar test was run for conventional silica aluminas, such as that prepared according to U.S. Patent 2,992,884, under identical conditions. The conventional alkalized alumina was found to have an adsorption capacity of 24 grams of sulfur dioxide per 100 grams of alkalized alumina.

Thus it may be seen that the alkalized alumina product of our invention represents a substantial improvement over the prior art.

Obviously, many modifications and variations of our invention may be made without departing from the essence and scope thereof.

We claim:

1. In the process of preparing a basic alkali aluminum carbonate by the reaction of an aluminum salt with an alkali metal carbonate which comprises:
    (a) preparing an aluminum salt solution,
    (b) preparing an aluminum metal carbonate solution,
    (c) admixing the aluminum salt solution and the alkali metal salt together at a temperature of from about 20 to 95° C. with constant stirring and maintaining the admixed solutions at a temperature of from about 20 to 95° C. with constant stirring for a period of at least 1 hour, whereby a basic alkali aluminum carbonate slurry is formed,
    (d) cooling and aging the slurry for at least 2 hours,
    (e) filtering the slurry to obtain a basic alkali aluminum carbonate filter cake,
    (f) washing and drying the filter cake to yield a dried basic alkali aluminum carbonate product,
    (g) the improvement which comprises adding a small quantity of sodium gluconate in the range of about 0.25 to 1 gram per 1000 grams of the sum of the aluminum salt solution and the alkali metal carbonate solution to either the aluminum salt or to the alkali metal carbonate solution prior to mixing whereby an alkali aluminum carbonate is produced.

2. The process of claim 1 wherein the basic alkali aluminum carbonate is converted to an alumina alkalate by heating at a temperature of from 400 to 1400° F. for from ½ to 4 hours.

3. The process of claim 1 wherein the aluminum salt is aluminum sulfate and the alkali metal carbonate is sodium carbonate.

4. The process of claim 1 wherein the sodium gluconate is added to the aluminum salt solution.

5. The process of claim 2 wherein the aluminum salt is aluminum sulfate and the alkali metal carbonate is sodium carbonate.

References Cited

UNITED STATES PATENTS

| | | | |
|---|---|---|---|
| 2,413,184 | 12/1946 | La Lande | 23—52 |
| 2,783,124 | 2/1957 | Grote | 23—315 |
| 2,783,127 | 2/1957 | Grote | 23—315 |
| 2,783,179 | 2/1957 | Grote | 23—315 |
| 2,992,884 | 7/1961 | Bienstock et al. | 23—2 |

HERBERT T. CARTER, Primary Examiner

U.S. Cl. X.R.

23—2, 61, 63, 315